United States Patent [19]

Fattal et al.

[11] Patent Number: 4,899,955
[45] Date of Patent: Feb. 13, 1990

[54] ANGLE ENCODER

[75] Inventors: Jean A. Fattal, Lexington; David J. Dugas, Westford; Louis L. Tella, Holden, all of Mass.

[73] Assignee: Raytheon Company, Lexington, Mass.

[21] Appl. No.: 300,635

[22] Filed: Jan. 23, 1989

[51] Int. Cl.⁴ .......................... F41G 7/22; G01C 19/28
[52] U.S. Cl. ................................ 244/3.21; 74/5.6 A; 244/3.16
[58] Field of Search ................. 244/3.1, 3.15, 3.16, 244/3.19, 3.2, 3.21; 74/5.6 A

[56] References Cited

U.S. PATENT DOCUMENTS

| | | | |
|---|---|---|---|
| 3,328,595 | 6/1967 | Todd, Jr. | 74/5.6 A |
| 3,886,361 | 5/1975 | Wester | 244/3.21 |
| 3,915,019 | 10/1975 | Zoltan | 74/5.6 A |
| 4,123,134 | 10/1978 | Meyers | 244/3.16 |
| 4,600,166 | 7/1986 | Califano et al. | 244/3.16 |

Primary Examiner—Charles T. Jordan
Attorney, Agent, or Firm—Philip J. McFarland; Richard M. Sharkansky

[57] ABSTRACT

An angle encoder for determining the pitch (or yaw) angle of a gyroscopic mass with respect to the pitch (or yaw) axis of a missile in flight is shown to be the combination of: (a) an optical encoder pattern disposed on the periphery of the gyroscopic mass, such pattern preferably being divided into a substantially equal reflective portion and a nonreflective portion; (b) an optical sensor arrangement having a limited field of view, such arrangement being mounted on the body of the missile to provide a first signal whose level is indicative of the reflective or nonreflective portion in the limited field of view; and (c) circuitry for converting the first signal into a signal indicative of the pitch (or yaw) angle of the missile.

4 Claims, 3 Drawing Sheets

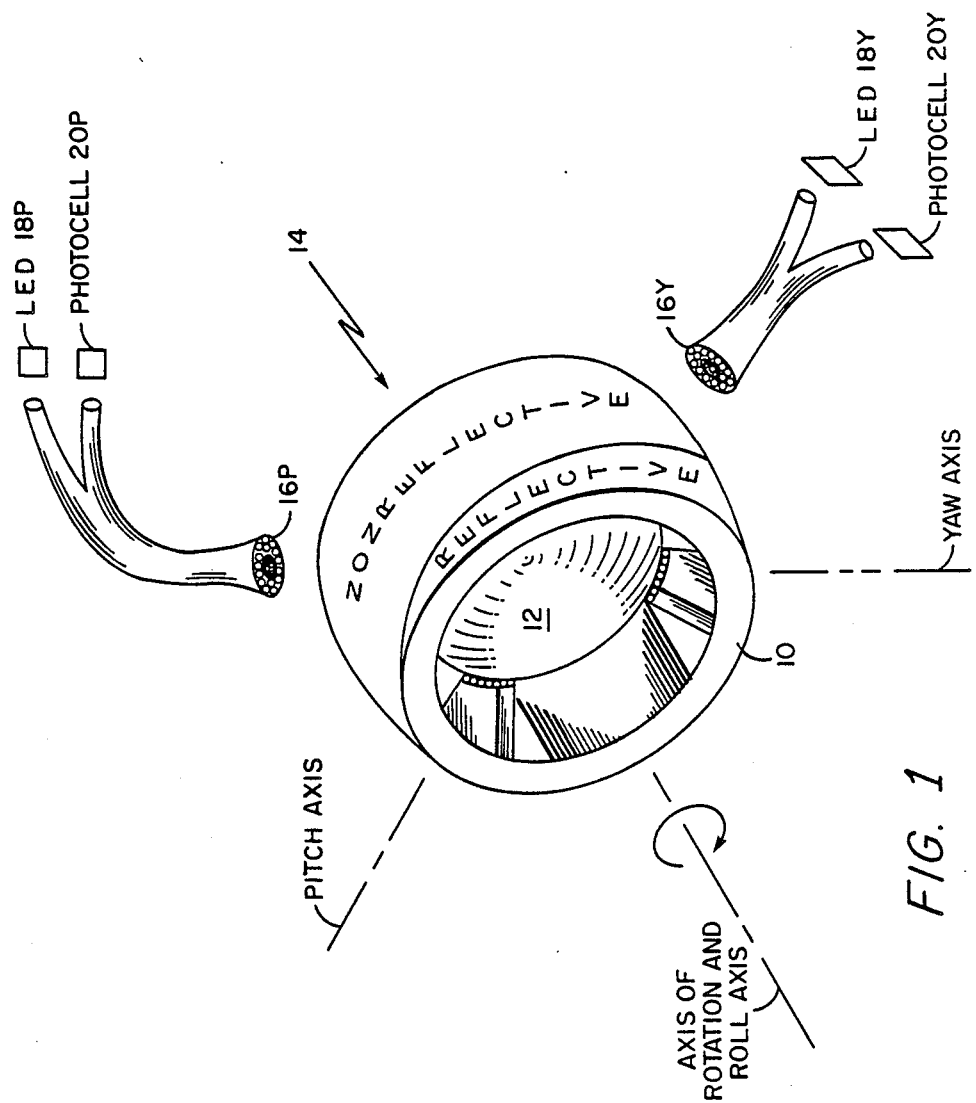

ANGLE ENCODER

BACKGROUND OF THE INVENTION

This invention pertains generally to gyroscopically stabilized equipment, and particularly to apparatus for measuring the angular relationship between a gyroscopically stabilized platform and a body in which such platform is mounted.

It is known in the art of guided missiles that gyroscopically stabilized platforms with two degrees of freedom (in pitch and yaw) may be used to advantage in guided missiles to support a sensor, as an infrared sensor or a radar antenna. Here such a platform is a rotating magnetized disk with a north and a south pole. With such an arrangement it is necessary that the pitch and yaw components of the angle between the boresight line of the sensor (which line may correspond with the axis of rotation of the gyroscopically stabilized platform) and the longitudinal axis of the guided missile be measured. The pitch component and yaw component (referred to hereinafter as the "pitch angle" and the "yaw angle") are usually measured by sensing current induced in so-called "cage coils," which current is indicative of the orientation of the gyroscopically stabilized platform (hereinafter referred to simply as "the platform"). In addition, so-called "reference coils" are provided to produce control signals for maintaining a substantially constant angular velocity of the gyroscopic mass in the platform. However, the current induced in any cage coil may result from magnetic interference generated in other necessary elements (such as drive and precession coils) on or near the platform, with the result that unacceptably large errors in the desired measurement are experienced.

BACKGROUND OF THE INVENTION

With the foregoing background of the invention in mind, it is a primary object of this invention to provide apparatus for accurately measuring pitch angle and yaw angle.

Another object of this invention is to provide measuring apparatus that does not depend on magnetic coupling between a cage coil and a magnetic gyroscopic element for measurement of pitch angle and yaw angle.

Another object of this invention is to eliminate noise due to magnetic interaction.

The foregoing and other objects of this invention are attained generally by providing (a) an optical encoder pattern formed on a gyroscope (hereinafter referred to as a "gyro") in conjunction with optical probes arranged to measure coded signals generated by the optical encoder pattern (which coded signals are indicative of the pitch and yaw angles); and (b) circuitry responsive to the coded signals for converting such signals to desired pitch and yaw angle signals. The invention assumes that the spin frequency and the phase relationship of the gyroscopic mass to the body of the missile are tightly controlled.

BRIEF DESCRIPTION OF THE DRAWINGS

For a more complete understanding of this invention reference is now made to the following description of the accompanying drawings, wherein:

FIG. 1 is a simplified sketch illustrating how an optical encoder pattern and optical probes are disposed relative to one another in accordance with this invention;

FIG. 1A is a developed view of the optical encoder pattern formed on the periphery of the gyro shown in FIG. 1;

FIG. 1B is a developed view of an alternative optical encoder pattern;

FIG. 3 is a simplified block diagram of preferred signal processing circuitry for signals produced in FIG. 1.

DESCRIPTION OF THE PREFERRED EMBODIMENT

Before referring to FIG. 1 in detail, it will be observed that only elements essential to an understanding of the invention have been shown. Thus, conventional elements such as drive coils, precession coils and any type of sensor (such as an infrared sensor) have not been shown for simplicity in illustration and explanation. With the foregoing in mind, it may be seen that a gyro 10 rotatable about an axis of rotation is mounted on a spherical bearing 12 by any convenient mounting arrangement (not numbered). The outer surface of the gyro 10 is shaped in the form of a zone of a sphere. It will be appreciated that the just-described mounting arrangement for the gyro 10 may be deemed to be the equivalent, functionally, of a conventional double gimbal. That is to say, with optical sensing means (described hereinafter) disposed as shown in FIG. 1, any angular movement of the axis of rotation of the gyro 10 away from the roll axis (of a missile, not shown) may be described by the resultant of angular movements in the orthogonal pitch and yaw planes (not shown). An optical encoder pattern 14 is formed on the outer surface of the gyro 10. Here, the optical encoder pattern 14 (as shown more clearly in FIG. 1A in a developed form 14') may be a pattern made up of an optically reflective portion 14R and an optically nonreflective portion 14N with a division between the two such portions, as shown.

A probe 16P and a probe 16Y, each made up of a first and a second bundle of optical fibers, are disposed adjacent to the optical encoder pattern 14. Probe 16P is mounted in any convenient way (not shown) near the yaw axis (not numbered). Similarly, probe 16Y is mounted near the pitch axis (not numbered). The first bundle of optical fibers in the probe 16P is arranged to conduct light from a light-emitting diode (LED 18P) and the second bundle of optical fibers in the probe 16P is arranged to conduct light reflected from the optical encoder pattern 14 to a photocell 20P. In like manner, the first and second bundles of optical fibers in the probe 16Y conduct light from a light-emitting diode (LED 18Y) to a photocell 20Y.

Figure 2A:
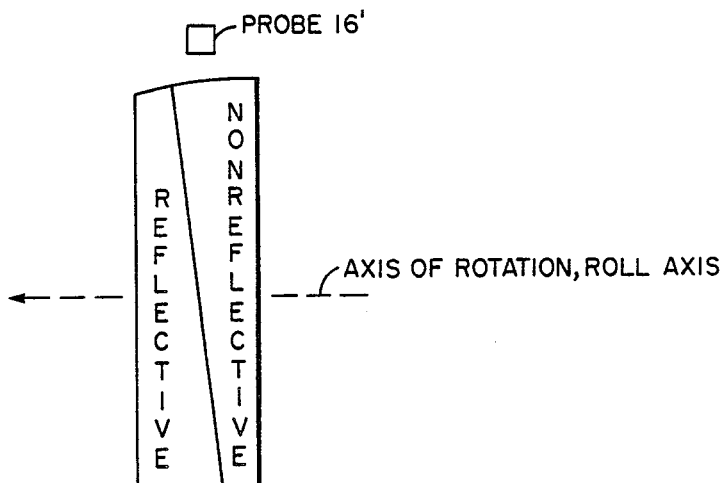
FIGS. 2A, 2B and 2C are sketches showing changes in the code produced by the combination of optical encoder patterns and optical probes shown in FIG. 1 when the pitch (or yaw) angle is changed.
Figure 2B:
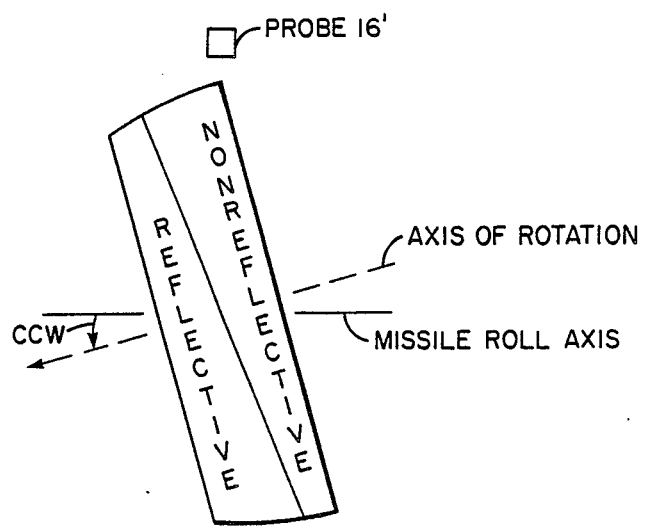
Figure 2C:
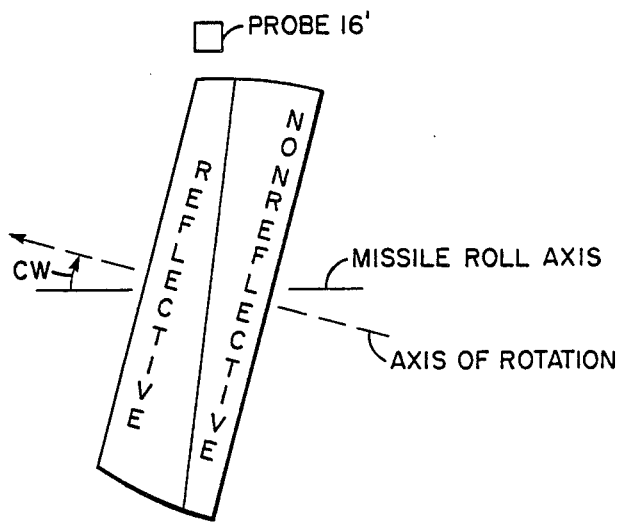

It will now be appreciated that precession of the gyro 10 causes a change in the duty cycle of the signal out of the photocells 20P, 20Y. Thus, when the axis of rotation of the gyro 10 corresponds with the roll axis (as illustrated in FIG. 2A), light from the exemplary probe 16' will fall on the reflective portion 14R for half the period of each revolution of the gyro 10 (FIG. 1) and otherwise on the nonreflective portion 14N. Consequently, the duty cycle of the signal out of the photocells 20P, 20Y (FIG. 1) will be 50%. If, however, the axis of rotation is precessed in a counterclockwise (CCW) direction as shown in FIG. 2B, the duty cycle of the signal will be less than 50%. Alternatively, if the axis of rotation is precessed in a clockwise (CW) direction as shown in FIG. 2C, the duty cycle will be greater than 50%.

It will also be appreciated that, unless each one of the probes 16P, 16Y (FIG. 1) is mounted exactly on its associated axis, errors induced by cross-coupling between pitch and yaw are experienced. However, such induced errors, being deterministic, may be reduced to insignificance through calibration.

Electrical pulses indicative of pitch and yaw angles are produced in two similar optical conversion circuits 21P, 21Y shown in FIG. 3. Only the optical conversion circuit 21P will be described. Thus, LED 18P is actuated in any convenient way by a current source 22 so that the level of the light from the probe 16P is substantially constant. The output of the photocell 20P is passed, via an amplifier 24, to a differential amplifier 26 to which a D.C. reference signal is also passed. The level of the reference signal is such that when the output of the photocell 20P is indicative of reflections from the reflective portion 14R (FIG. 1A), the output of the differential amplifier 26 is at a logic one level, and when the output of the photocell 20P is indicative of reflections from the nonreflective portion 14N (FIG. 1A), the output of the differential amplifier 26 is at a logic zero level. That is to say, the output of the differential amplifier 26 may be considered to be a gating signal whose length is indicative of the pitch angle of the gyro 10 (FIG. 1). The output of the differential amplifier 26 then is used in any known manner to allow clock pulses (c.p.) from any convenient source to be passed to a counter 28. The incremental count of the counter 28, each time a gating signal occurs, then is indicative of pitch angle.

The alternative form of optical encoder pattern shown in FIG. 1B is useful when it is possible that two probes may be used to measure pitch and two probes may be used to measure yaw. Thus, if, in any particular application, there is room for a second probe on the yaw axis (FIG. 1) and a second probe on the pitch axis (FIG. 1), the optical encoder pattern 14' shown in FIG. 1A may be changed to the pattern 14" shown in FIG. 1B. If the resolution of the optical encoder pattern is to be kept constant, the slopes of the slanting lines in FIGS. 1A and 1B are made to be the same. In the embodiment shown in either FIG. 1A or FIG. 1B the pattern may be attained by: (a) treating the periphery of the gyroscopic mass so that (as indicated in FIG. 1) one portion is reflective and the other portion is nonreflective; or (b) changing the reflectivity of the line formed at the intersection of the two portions. The latter embodiment may be attained during fabrication in any one of a number of ways, as by machining or using a laser beam to form the desired line of demarcation.

In addition, as shown in FIG. 1B, a timing line 30 may be formed on the periphery of the gyroscopic mass in any convenient manner. The timing line 30 is wider than the line defining the pattern of the optical encoder pattern shown in FIG. 2A so that the two lines may be distinguished. In operation the frequency of the clock pulses (FIG. 3) may be adjusted in accordance with the frequency of the timing line 30 to compensate for variation in the rotational speed of the gyroscopic mass 10 (FIG. 1), thereby eliminating the need for a reference coil.

Having described preferred embodiments of this invention, it will be appreciated that changes may be made without departing from our inventive concepts. It is felt, therefore, that this invention should not be restricted to the disclosed embodiments, but rather should be limited only by the spirit and scope of the appended claims.

What is claimed is:

1. In a guided missile incorporating a guidance system wherein a gyroscopic mass with a periphery in the form of a zone of a sphere rotatable about a rotational axis and a gyroscopically stabilized platform are supported on at least one set of gimbals to permit angular movement between such platform and the body of such missile about a reference axis defined by at least one set of gimbals, such arrangement comprising:
    (a) an optical encoder pattern disposed on the periphery of the gyroscopic mass, such encoder pattern providing substantially equally-sized first and second portions separated by a spiral line, the reflectivity of the first and second portions differing; and
    (b) optical sensing means including a sensor assembly affixed to the guided missile adjacent to the reference axis near the optical encoder pattern to produce, during each revolution of the gyroscopic mass, an output signal indicative of any angular movement between the gyroscopically stabilized platform and the body of the guided missile about the reference axis, the sensor assembly comprising:
        (i) a first optical transmission means including a first optical fiber having a first end disposed adjacent to the reference axis near the optical encoder pattern and a second end spaced from the first end within the body of the guided missile; and
        (ii) a light emitting diode disposed near the second end of the first optical fiber whereby light from such diode is directed to a limited area on the periphery of the gyroscopic mass.

2. The arrangement as in claim 1 wherein the sensor assembly comprises, additionally:
    (a) a second optical transmission means including a second optical fiber having a first end adjacent to the first end of the first optical fiber to receive light reflected from the limited area on the periphery of the gyroscopic mass and direct such light to a second end of the second optical fiber within the body of the guided missile; and
    (b) a photocell disposed adjacent to the second end of the second optical fiber to convert light from such fiber to a corresponding electrical signal.

3. The arrangement as in claim 2 comprising, additionally:
    (a) means, responsive to the corresponding electrical signal out of the photocell, for converting such signal to a gating signal having a first value during each revolution of the gyroscopic mass when the limited area on the periphery of the gyroscopic mass corresponds with the first portion of the optical encoder pattern and a second value when such area corresponds with the second portion of the optical encoder pattern; and
    (b) counting means, responsive to clock pulses when the gating means has the first value, to produce a count indicative of the output signal.

4. In a guided missile incorporating a guidance system wherein a gyroscopic mass with a nominally reflective periphery in the form of a zone of a sphere rotatable about a rotational axis and a gyroscopically stabilized platform are supported on at least one set of gimbals to permit angular movement between such platform and the body of such missile about a reference axis defined by the at least one set of gimbals, such arrangement comprising:

(a) an optical encoder pattern disposed on the nominally reflective periphery of the gyroscopic mass, such encoder pattern including:

(i) a timing line corresponding to an arc of a great circle co-planar with the rotational axis and intersecting the periphery, such timing line being substantially nonreflective; and (ii) a spiral line, such line being substantially nonreflective; and (b) optical sensing means including a sensor assembly affixed to the guided missile adjacent to the reference axis near the optical encoder pattern to produce, during each revolution of the gyroscopic mass, an output signal indicative of any angular movement between the gyroscopically stabilized platform and the body of the guided missile about the reference axis.

* * * * *